Nov. 3, 1942.   V. S. GOLOVIZNIN   2,300,565
SUBMARINE DETECTOR
Filed Sept. 13, 1939
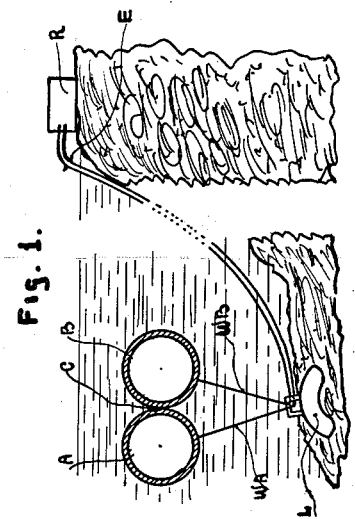
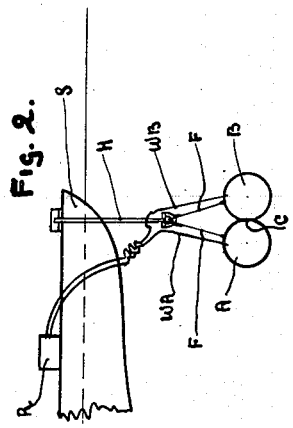
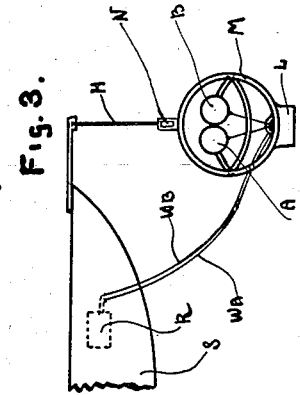
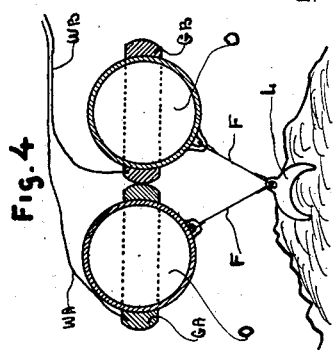
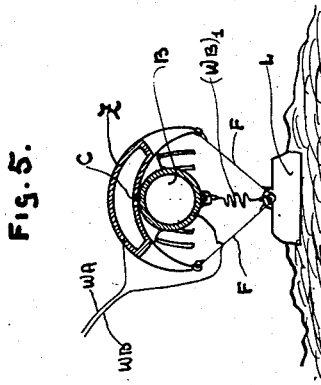
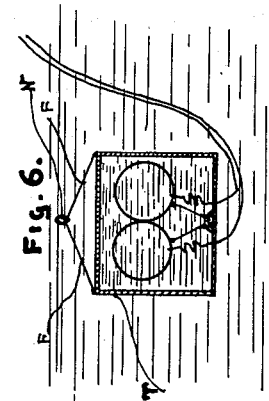
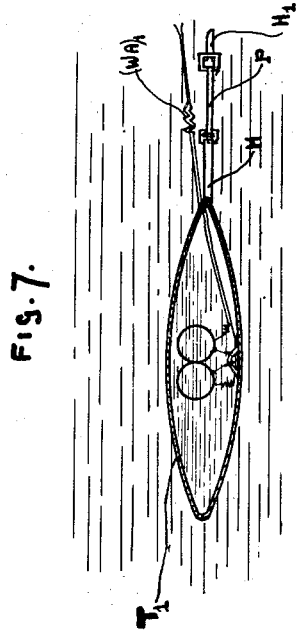
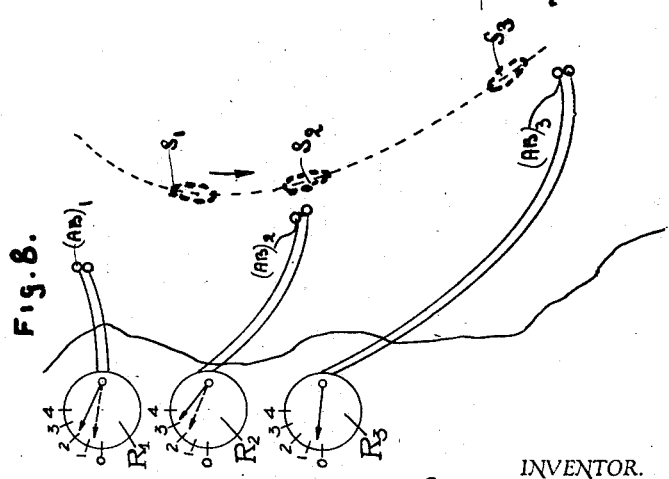
INVENTOR.
Vl. S. Goloviznin.

Patented Nov. 3, 1942

2,300,565

UNITED STATES PATENT OFFICE 2,300,565

SUBMARINE DETECTOR

Vladimir S. Goloviznin, New York, N. Y., assignor of one-half to George A. Rubissow, New York, N. Y.; Eugenia Goloviznin administratrix of said Vladimir S. Goloviznin, deceased, assignor of one-half to Walter Goloviznin, Sea Cliff, Long Island, N. Y.

Application September 13, 1939, Serial No. 294,651

7 Claims. (Cl. 177—385)

This invention relates to a method and apparatus for detecting the presence of submarines, ships and other kinds of moving motor vessels, for the determination of their direction of movement and their relative distances in respect to the said detector apparatus.

The novel features of this invention will more fully appear from the following description when the same is read in connection with the accompanying drawing and the appended claims. It is to be expressly understood, however, that the drawing is for purposes of schematical illustration only and is not intended as a definition as to the design or to the limits of the several aspects of this invention.

All figures represent different aspects of this invention in simplified and diagrammatical form of illustration.

In the drawing wherein like reference characters refer to like parts throughout the several views:

Figure 1 is a side view, partly in section, of the apparatus submerged in water.

Figures 2 and 3 are side views of another aspect of the apparatus attached to a ship and submerged to a certain depth.

Figures 4 and 5 are another aspect of the apparatus in cross-sectional side view.

Figures 6 and 7 are another aspect of an apparatus, partly in cross section.

Figure 8 is a plan view of one of the methods of using the said apparatus.

One aspect of this invention is clearly illustrated in Figure 1 wherein the device is composed of two metallic, hollow, preferably spherical bodies, A and B, each of which is attached to an insulated wire, WA and WB, which wires, WA and WB, pass through a heavy attachment L and thereafter are conducted out of the water to the detecting receiver R.

If the said hollow spherical bodies, A and B are to be plunged into salt water, they may be made of any metals or metallic al'oys which produce an electrical current when put in salt water. By way of example the sphere A may be made of copper and the sphere B may be made of zinc. All other materials known to produce similar currents may be used. One body may be made from carbon in a pressed form, for instance, or covered by carbon mixed with other materials or may be painted by a heavy carbon paint.

The wires WA and WB are each attached or soldered to one sphere, WA is attached to A and WB is attached to B. The wires have to be insulated in order not to lose the electrical current which passes through them. The said current passing through WA and WB is transmitted to the receiver R. On the entire route from the place where the hollow bodies A and B are submerged to the receiver R (which route may be as long as desired) both wires are insulated. Furthermore, they may be conducted individually or both may be placed in one armament or the like. Since the bodies A and B are both hollow, they may be so made that their buoyance will create the required pressure on the contact surfaces C of the spheres. If necessary, the buoyance of one sphere may be greater than that of the other or they may be equal.

The electrical current passing from one sphere to another when the spheres touch one another slightly varies when the spheres move slightly one in respect to the other or when the spheres are subjected to any vibrations which affect them. In our example the bodies A and B touch one another theoretically at one point C, which, if the water is still, may be a constant point, but as soon as one of the bodies moves one in respect to the other, the electrical current which first passes through C becomes a variable current because the contact surface C changes continuously, and these changes or variations of the contact surface resistance changes the intensity of the electric currents or of their character, and such changes may be immediately converted into a visible or audible or mechanical sign by means of a suitable arrangement in the receiver R. Such a receiver may be a telephone or a membrane or a loud speaker or any photo-electric cell arrangement or a mechanical relay or an electro-mechanical relay or a magnetic relay or any combination of them. All known converters of electrical current variations into light effects, sound effects, supersound effects or mechanical effects or any combination of them may be used to form the receiver R. The said device may be plunged into the water to any depth desired. The essential point is that the two hollow bodies will be preferably on the same horizontal line so that if they rotate, they still remain on the same horizontal line. If possible, they may be plunged so deep that the water where they have been dropped is not affected greatly by the waves of the sea. Preferably they should be submerged at such a depth where the water is still, or substantially so. Bodies A and B submerged in the sea produce themselves the electric current which gives under normal conditions one of the described signs or effects in the receiver R; for instance, they may produce a substantially uniform hum or sound or throw a light of certain intensity or certain periodical variation, or move the indicator of an instrument to a certain degree.

As soon as a submarine or another kind of motor vessel approaches within the field of sensitivity of the apparatus, the mechanical movements, trepidations, vibrations or the like produced by the engine of the motor and/or by the propeller of a vessel and by the mechanical vibrations through the walls of the vessel are communicated through the water even if this water is in movement from natural causes, to the hollow bodies A and B and produce a variation of the resistance of the contact surface C of the hollow bodies A and B, and this changes the electrical current which changes are immediately detected by the receiver. Tests have shown that the efficiency is extremely great and submarines and ships in particular could be located at very great distances.

If necessary, the bodies A and B, instead of being hollow may be solid bodies and in this case, it is advisable to have a floater which is attached by at least one flexible connection to each of the solid bodies, the buoyance of the float (taking into consideration the weight of the solid bodies and the weight of the wires) may be so chosen that it will be possible to keep the apparatus at the desired depth and the weight of the bodies may be so chosen that the desired sensitivity to the resistance of the contact surfaces of the bodies will be available.

Bodies A and B as described in all this specification may be also made of like metals or metal alloys. In this case, it will be necessary to provide them with a source of electric current of any character desired. This current may be produced for instance, by a storage battery or dry battery or dynamo; it may be direct or alternating current. The mode of operation of the bodies charged by such current is exactly the same as previously described. The latter devices may be used equally well in salt or fresh water.

The receiver itself may be placed on the ground of a shore or on a ship or even in a submarine.

The form of the bodies A and B may be of any desirable contour, for instance, an elliptical one, an oval one or the like. The dimensions of one body (and in particular the largest diameter) may be equal to the dimensions of the other body, or one body may be larger than the other one. The main point is that the contact surface between the bodies will be very sensitive in the sense of resistance to electrical current.

In Figure 2 is shown a method of using another type of the apparatus from the deck of a ship. The apparatus is composed, by way of example, of a flexible or rigid connection H, attached to the ship S, on the other end of which connection H are suspended by means of two flexible connections F two metallic bodies A and B having preferably a spheric contour and having such weight that they remain suspended on the connections F and remain so suspended substantially in a horizontal line and effect on each other such a pressure that the desired sensitivity to the resistance of the electric current passing through A and B is available. The bodies A and B may be hollow or not, and may have just such a weight that the pressure on their contact surface C is just what is desired for the required receiver R. A and B are provided as previously described with insulated wires WA and WB connected to the receiver R.

A similar arrangement as shown in Figure 3, consists of a connection H provided with a casing M made from metal or other material in which casing may be placed one of the devices as described in this specification.

In Figure 4 instead of using bodies A and B made entirely from metal, the cores E—F of these bodies may be made of any desirable material such as glass, "bakelite," wood, etc. These cores may be hollow, partly hollow or solid. These cores are provided with spherical girdles GA and GB which are made of metal or metal alloys and replace the action as described for the bodies A and B for Figures 1, 2 and 3. The contact surface of the girdles may be curved line or a straight line.

Another aspect of this invention may consist of any kind of arrangement of two hollow bodies of any desirable contour, both convex or both concave or one convex and the other concave, the action of which will be identical with the action as described for the behavior of the electric current in A and B, Figures 1, 2, 3 or 4. One of such bodies may be placed at the side of the other, on the top or underneath the other. By way of example in Figure 5 is shown a body Z which is attached to the ground by flexible connections F in which concave body the sphere B is placed, being kept in its position by its own buoyance. There are two or more connections F, the one attached to the anchor L remains in a tightened position because of the buoyance of Z. The body B is freely movable in the concave contour of Z (because of the other connection $(WB)_1$ which is not tightened) and in its normal position contacts Z in the point C. A vice versa arrangement of Z—B may also be used.

The bodies as described in Figures 1 to 5 may also be cylinders, so that their axes are parallel or at any angle to each other. If parallel the contact surface will be a line, if at an angle the same will be substantially a point.

Instead of just two, more than two bodies, hollow or solid, may be used and they must then be combined in groups of two by means of insulated wires so that there will always be possible a flow of current in the so obtained groups. The apparatus may consist of two, three or more in one operating composite unit, each apparatus consisting of at least two bodies A and B, or the like.

In Figure 6 is shown another aspect of an apparatus. A and B are placed into a hermetical container T, which container is filled with a fluid able to easily transmit vibrations from the exterior to the spheres A and B. Such fluid may be for instance water, alcohol, ether, etc. The fluid may be a fluid in which chemicals, acid or electrolytes are dissolved.

The container T is placed on the ground of the sea or river or is suspended by means of a float or an attachment to the desired depth. This aspect may be used in cases where there is water current around the container T. Such water current will then not affect directly the bodies A and B, but as soon as any vibration reaches the walls of the container T, the fluid in the container will transmit the vibration to the bodies A and B and the electrical current will vary.

If desired, the container T need not be a hermetic one, but have some holes, so that the sea water or the fresh water will penetrate therein.

If desired, the fluid in the container may be under pressure or may be under vacuum. The liquid in a hermetic container may be under depression. In many cases the walls or at least some walls may be made from membranes, from metal or fibre or glass, mica, etc.

In Figure 7 a device as described in Figure 6 is placed in a container $T_1$, having a fish-like form. Such device may be attached to the ship or submarine when the same is moving and the attachment may be made by means of a long connection $H—H_1$. Between H and $H_1$ rubber P or other elastic means may be inserted to reduce the transmission of the vibration of the ship which is using the device.

The wires may be conducted as shown in Figure 7 and may also have zig-zag or coil-like intervals $(WA)_1$ (same as $(WB)_1$ in Figure 5), to prevent the stressing of the wires.

One of the methods of detecting provided by means of the apparatus described is shown in Figure 8 wherein a submarine S is shown in its first $S_1$, second $S_2$ and third $S_3$ positions in respect to the shore. The detector apparatuses A and B are placed as shown $(AB)_1$ $(AB)_2$ and $(AB)_3$. The receivers are shown by $R_1$, $R_2$, $R_3$. The submarine goes from its position $S_1$ as shown by the arrow. In its position $S_1$, it is at an equal distance from $(AB)_1$ and $(AB)_2$; therefore, the reaction of $R_1$ will be equal to the reaction of $R_2$. All the receivers $R_1$, $R_2$, $R_3$, are so made that the movement of the fingers which takes place when the impulse is received, provides the same angular displacement of each respective finger. In the case that $R_1$ receives through device $AB_1$ an impulse from submarine $S_1$, and the distance between $AB_1$ and $S_1$, and $AB_2$ and $S_2$ be the same, then the finger of receiver $R_1$ will indicate the number 2 on the dial. The finger on receiver $R_2$ will actuate in the same manner and also point out the number 2 on its dial. The operator of these two receivers will thus be informed that the submarine is equi-distant from the apparatus $AB_1$ and $AB_2$. As soon as the submarine moves to its position $S_2$, the finger on receiver $R_1$ will move, as shown in dotted lines, and point out #1, for example, while at the same time, the finger of receiver $R_2$ will indicate the number 3, for example, also shown in dotted line. The operator or observer of these receivers will thus be informed that the submarine $S_3$ lies closer to the position of the detector $AB_2$ than to the position of $AB_1$. At the same time, the finger of receiver $R_3$ may also move slightly, for instance, near to position 1 on the dial, thereby indicating the relative distance from the detector device $AB_3$. The second position $S_2$ causes a reaction $R_2$ which is stronger than the reaction $R_1$. At the same time the reaction $R_3$ will begin to augment. These indications will give a definite indication of the approach of the submarine and by way of tests and comparisons can indicate exactly where the submarine is, because of three known variables, each of which changes accordingly. This method may be employed for the protection of shores, ports, ships, entrances into rivers, channels, etc. and may also be used for finding any object in the water which creates a distinctive vibration.

Having now particularly described and ascertained the nature of my said invention and in what manner the same is to be performed, I declare that what I claim is:

1. An apparatus for detecting the approach of vessels, consisting in at least two bodies submerged under water at a predetermined depth and provided with a material capable of conducting electricity; each of said bodies being maintained at the said predetermined depth by attaching means; each of said attaching means being attached by one of their ends to the said bodies and by their other ends in a predetermined fixed relationship to the ground underneath the water, the horizontal component of the buoyancy exercising on each of the said bodies a predetermined pressure, said horizontal component being sufficient to provide said pressure between the said bodies; means to permit at least one of said bodies to move freely but limited substantially in the horizontal plane while maintaining the same buoyancy; a contact surface being provided between the said materials while pressed one against the other; at least one insulating wire being attached by its one end to each of the said materials; means to provide and maintain an electric current in the said wires and the said materials; means attached to the other end of the said wires for registering the variations of the said electric current; said variations caused by sound waves or like pulses; and means by which said variations are converted into signals.

2. An apparatus for detecting the approach of vessels, consisting in at least two hollow metallic ball-like formed bodies submerged under water at a predetermined depth and provided with a material capable of conducting electricity; means to maintain the said bodies at the predetermined depth by suitable attaching means, each of said attaching means being attached by one of their ends to the said bodies and by their other ends in a predetermined fixed relationship to the ground underneath the water, the horizontal component of the buoyancy exercising on each of the said bodies a predetermined pressure, said horizontal component being sufficient to provide said pressure between the said bodies; a contact surface being provided between the said materials in the place where they touch each other when pressed one against the other by the force of the said horizontal component; means to permit at least one of the said materials to move freely but limitedly in the horizontal plane while maintaining the same buoyancy and while continuously contacting the other material; at least one insulating wire being attached by its one end to each of the said materials; means to provide and maintain an electric current in the said wires and the said materials; means attached to the other end of the said wires for registering the variations of the said electric current; said variations caused by sound waves or like pulses; means to convert said variations into signals.

3. An apparatus for detecting the approach of vessels, consisting in at least two hollow bodies made from insulated material, each body having an encircling girdle made of material capable of conducting electricity, attaching means to maintain the said bodies at the predetermined depth by suitable attaching means, each of said attaching means being attached by one of their ends to the said bodies and by their other ends in a predetermined fixed relationship to the ground underneath the water, the horizontal component of the buoyancy exercising on each of the said bodies a predetermined pressure, said horizontal component being sufficient to provide said pressure between the said bodies, a contact surface being provided between the said girdles in the place where they touch each other when pressed one against the other by the force of the said horizontal component of the force of the buoyancy of the said bodies, means to permit at least one of the said bodies to move freely but limitedly in substantially horizontal plane while maintaining the same buoyancy and while continuously contacting the other body, at least one insulating wire being attached by its one end to each of the said girdles, means to provide and maintain an electric current in the said wires and the said girdles, means attached to the other end of the said wires for registering the variations of the said electric current caused by sound waves or like pulses, means to convert said variations into signals.

4. An apparatus as set forth in claim 1 wherein one of the said bodies is made of copper and the other said body from zinc.

5. An apparatus as set forth in claim 1 wherein the said bodies are placed into a hermetically closed container filled with a fluid, the walls of the said container being made from material through which the sound waves or like pulses could easily be transmitted.

6. An apparatus as set forth in claim 2 wherein the said material from which the said bodies are made has a specific gravity heavier than water.

7. An apparatus as set forth in claim 3 wherein the specific gravity of the said bodies, including the said girdles, is lighter than the specific gravity of water in which they are submerged.

VLADIMIR S. GOLOVIZNIN.